(12) United States Patent
Hozumi et al.

(10) Patent No.: US 7,856,300 B2
(45) Date of Patent: Dec. 21, 2010

(54) SEAT WITH SIDE SUPPORT CONTROL FOR VEHICLE RESPONSIVE TO DISTANCE AND POSITION IN CURVE ROADS

(75) Inventors: Soichiro Hozumi, Nagoya (JP); Toshiro Maeda, Anjo (JP); Yuki Fujii, Anjo (JP); Koji Hattori, Toyota (JP); Tomonori Suzuki, Seto (JP)

(73) Assignees: Aisin Seiki Kabushiki Kaisha, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 622 days.

(21) Appl. No.: 11/943,316

(22) Filed: Nov. 20, 2007

(65) Prior Publication Data

US 2008/0119998 A1    May 22, 2008

(30) Foreign Application Priority Data

Nov. 21, 2006   (JP) .............................. 2006-313814

(51) Int. Cl.
*G06F 17/00* (2006.01)
(52) U.S. Cl. ..................... 701/49; 297/284.9
(58) Field of Classification Search .................. 701/36, 701/45, 49
See application file for complete search history.

(56) References Cited

U.S. PATENT DOCUMENTS

| | | | | |
|---|---|---|---|---|
| 5,129,704 A | * | 7/1992 | Kishi et al. | 297/284.1 |
| 5,707,109 A | * | 1/1998 | Massara et al. | 297/284.9 |
| 5,975,633 A | * | 11/1999 | Walk et al. | 297/284.9 |
| 6,037,731 A | * | 3/2000 | Fruehauf et al. | 318/468 |
| 6,720,750 B2 | * | 4/2004 | Stachowski et al. | 318/466 |
| 6,873,892 B2 | * | 3/2005 | Katz et al. | 701/49 |
| 7,327,234 B2 | * | 2/2008 | Egami et al. | 340/429 |
| 7,734,404 B2 | * | 6/2010 | Shiiba et al. | 701/70 |

FOREIGN PATENT DOCUMENTS

| | | |
|---|---|---|
| JP | 4-031138 A | 2/1992 |
| JP | 2750943 | 2/1998 |
| JP | 2005-88834 | 4/2005 |

OTHER PUBLICATIONS

U.S. Appl. No. 12/016,490, filed Jan. 18, 2008, Hozumi, et al.
U.S. Appl. No. 11/940,664, filed Nov. 15, 2007, Hozumi, et al.
U.S. Appl. No. 11/941,410, filed Nov. 16, 2007, Hozumi, et al.
U.S. Appl. No. 11/987,715, filed Dec. 4, 2007, Hozumi, et al.
U.S. Appl. No. 11/934,975, filed Nov. 5, 2007, Hozumi, et al.

* cited by examiner

*Primary Examiner*—Thomas G Black
*Assistant Examiner*—Sze-Hon Kong
(74) *Attorney, Agent, or Firm*—Oblon, Spivak, McClelland, Maier & Neustadt, L.L.P.

(57) ABSTRACT

A seat apparatus for a vehicle including a motor for operating a side support portion, includes, a sensor for detecting that the vehicle is driven on a curve, a distance between curves calculating program for calculating a distance between curves, and a control state determining program for determining a control state of the vehicle, the control state being set to one of an unexecuted state, an executed state and a standby state, wherein the motor operates the side support portion so as to be retained to a supporting position when the control state of the vehicle is set to the executed state.

18 Claims, 7 Drawing Sheets

Side support control program

Straight portion running program

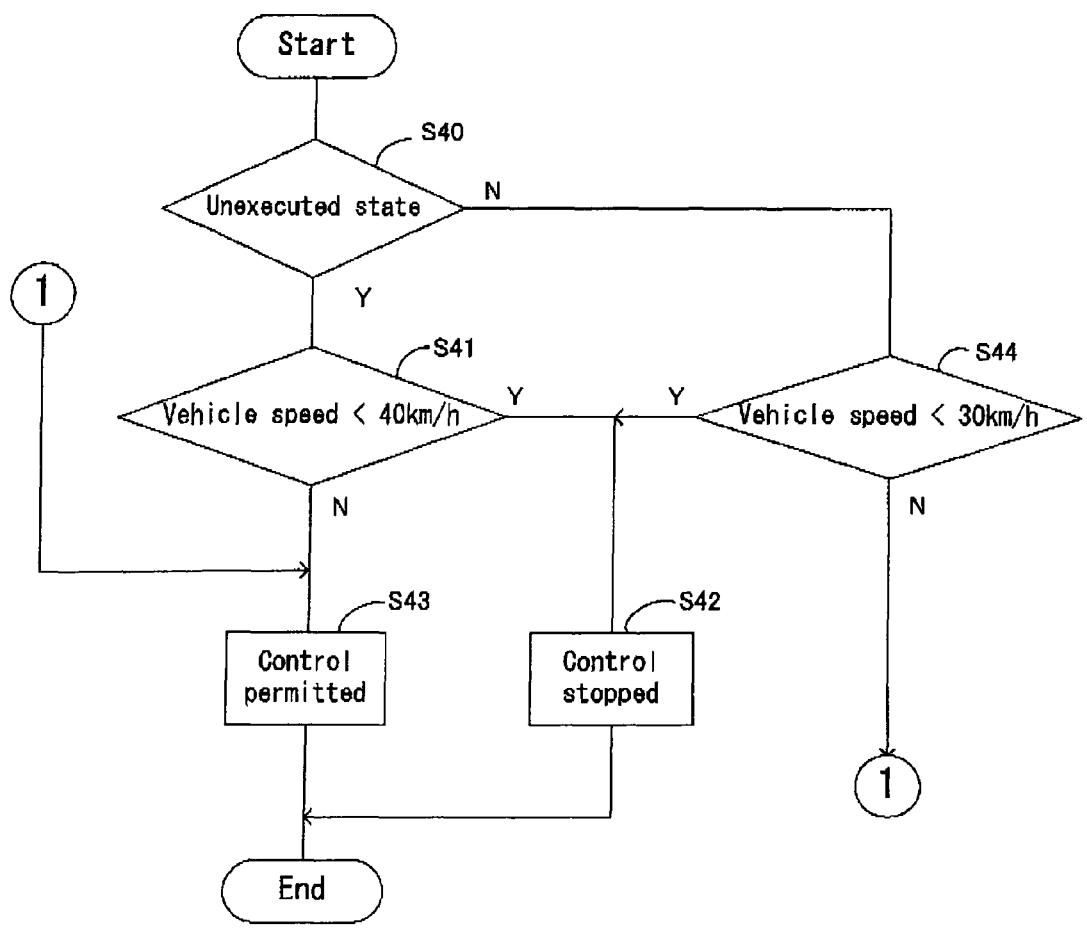

SEAT WITH SIDE SUPPORT CONTROL FOR VEHICLE RESPONSIVE TO DISTANCE AND POSITION IN CURVE ROADS

CROSS REFERENCE TO RELATED APPLICATIONS

This application is based on and claims priority under 35 U.S.C. §119 to Japanese Patent Application 2006-313814, filed on Nov. 21, 2006, the entire content of which is incorporated herein by reference.

FIELD OF THE INVENTION

The present invention relates to a seat apparatus for a vehicle that controls a side support portion depending on a road shape.

BACKGROUND

A vehicle controlling apparatus disclosed in JP2005088834A includes a suspension control device and a navigation device. The navigation device determines that the vehicle is driven on a winding road that has, for example, two curves (e.g., a previous curve and a current curve) including a straight portion therebetween, based on electronic map data, and the suspension control device controls a suspension on the basis of the determination of the navigation device. In his configuration, even when the navigation device determines that the vehicle is driven on the straight portion, the suspension is controlled. In the light of this configuration, it is conceivable that a side support portion may be controlled in the same manner as the suspension being controlled by the vehicle controlling apparatus. As a result, an occupant of the vehicle seat may not feel frequent actuations of the supporting operation.

However, if the side support portion is controlled in the same manner as the suspension control by the vehicle controlling apparatus, when the vehicle does not have the navigation device, or when the vehicle having the navigation device is driven on a road where a GPS sensor of the vehicle does not receive signal correctly, the side support portion may not be controlled appropriately.

On the other hand, a seat apparatus for a vehicle disclosed in JP2750943 is well known. When vehicle lateral accelerations are continuously detected, the seat apparatus determines that the vehicle is driven on a road having plural curves, such as a winding road, and then a supporting operation is executed. During the supporting operation, the seat apparatus is controlled in order to retain a side support portion to a position where a human body is supported thereby (hereinbelow, referred also to as a supporting position). According to the seat apparatus disclosed in JP2750943, the side support portion is retained to the supporting position without depending on an electronic map data. As a result, an occupant of the vehicle seat may not feel frequent actuations of the supporting operation.

However, because the seat apparatus disclosed in JP2705943 determines that the vehicle is driven on the winding road when the lateral acceleration is continuously generated at the vehicle for a certain time period, even when it is determined that the vehicle is driven on another winding road, the seat apparatus may or may not continuously retain the side support portion to the supporting position when a vehicle speed varies.

A need thus exists for a seat apparatus for a vehicle which is not susceptible to the drawback mentioned above.

SUMMARY OF THE INVENTION

According to an aspect of the present invention, a seat apparatus for a vehicle including a driving means for operating a side support portion in accordance with a road shape, includes a sensor for detecting that the vehicle is driven on a curve of the road shape, a distance between curves calculating program for calculating a distance between curves on the basis of the detected result of the sensor, the distance between curves being a distance between an ending point of a previous curve, on which the vehicle had been driven, and a starting point of a current curve, on which the vehicle is currently driven; and a control state determining program for determining a control state of the vehicle on the basis of the distance between curves calculated by the distance between curves calculating means, the control state being set to one of an unexecuted state, an executed state and a standby state, wherein, in the unexecuted state, it is determined that the vehicle is not driven on continuous curves, in the executed state, it is determined that the vehicle is driven on the continuous curves, and in the standby state, it is determined that the vehicle is possibly driven on the continuous curves, the control state is changed from the unexecuted state to the executed state via the standby sate, and the control state is changed from the executed state to the unexecuted state via the standby sate; wherein the control state determining program, setting the control state to the standby state, when the vehicle is driven on the current curve, after the vehicle, which was in the unexecuted state, was driven on the continuous curves, the continuous curves being connected by a distance between curves, and when the control state determining program detects a case where the distance between curves is a first threshold or less, calculates a number of the continuous detections, and determines that the number of detections reaches a first criterial number, setting the control state to the executed state, when the vehicle is driven on the current curve, after the vehicle, which was in the standby state, was driven on the continuous curves, the continuous curves being connected by a distance between curves, and when the control state determining program detects a case where the distance between curves is a second threshold or less, calculates a number of the continuous detections, and determines that the number of detections reaches a second criterial number, setting the control state to the unexecuted state, after the control state was set to the standby state while the vehicle was driven on the previous curve, and when the straight portion driving distance between the ending point of the previous curve and a current position is larger than the second threshold, setting the control state to the executed state when the vehicle is driven on the current curve, after the vehicle, which was in the standby state before the vehicle is driven on the current curve, was driven on a straight portion between a starting point of the standby state and a starting point of the current curve, and when a straight portion driving distance of the straight portion being a third threshold or less, setting the control state to the unexecuted state when a straight portion driving distance between the starting point of the standby state and the current position is larger than the third threshold, and setting the control state to the standby state after the control state was set to the executed state while the vehicle was driven on the previous curve, and a straight portion driving distance between the ending point of the previous curve and the current position is larger than a fourth threshold; and the driving means operating the side support portion so as to be retained to a supporting position when the control state of the vehicle is set to the executed state.

BRIEF DESCRIPTION OF THE DRAWINGS

The foregoing and additional features and characteristics of the present invention will become more apparent from the following detailed description considered with reference to the accompanying drawings, wherein;

FIG. 10 illustrates a flowchart indicating a control forcible termination program according to the seat apparatus of the second embodiment.

DETAILED DESCRIPTION

Figure 1:
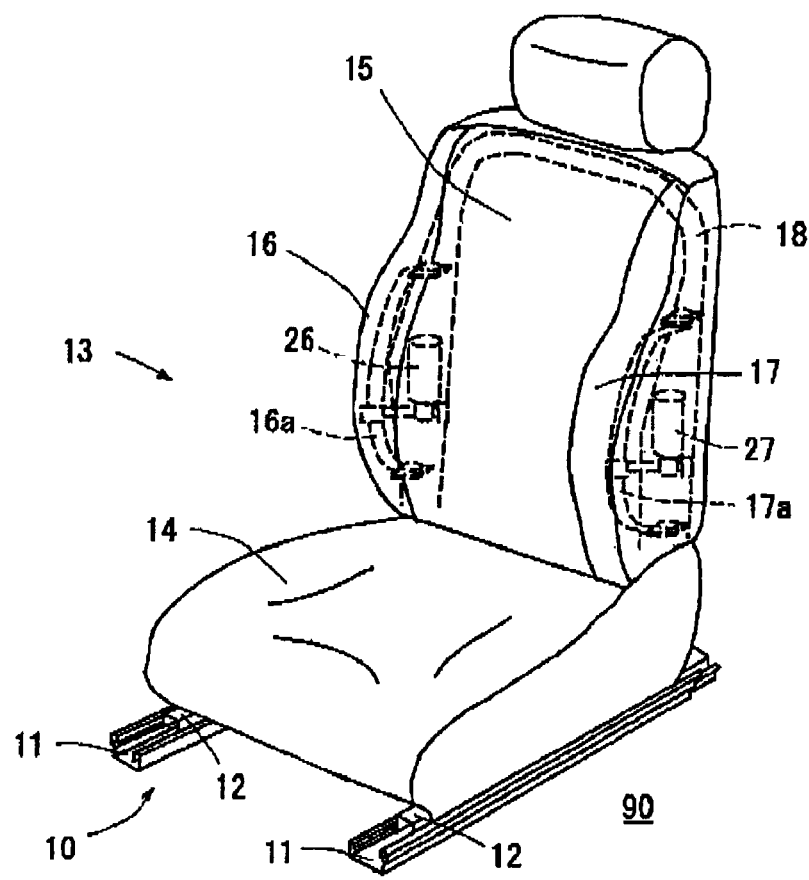
FIG. 1 illustrates a diagram indicating an oblique perspective view of a seat apparatus according to the first and second embodiments.
Figure 2:
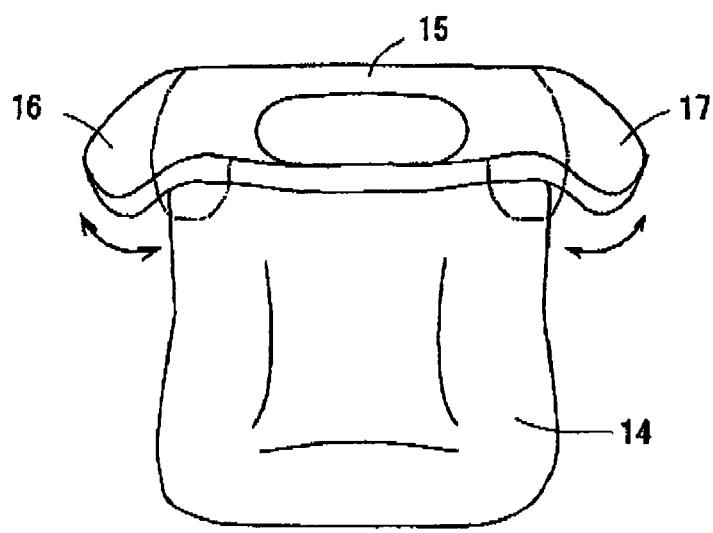
FIG. 2 illustrates a diagram indicating a flat view of a seat apparatus according to the first and second embodiments.

Embodiments of a seat apparatus for a vehicle (hereinafter referred to simply as a seat apparatus) related to the present invention will be described in accordance with the attached drawings. As illustrated in FIG. 1, a seat apparatus of a first embodiment includes a seat slide device 10 and a seat 13. The seat slide device 10 includes, for example, a pair of lower rails 11 and a pair of upper rails 12 supported by the lower rails 11 so as to be slidable thereon. The lower rails 11 are fixed on a floor 90 so as to extend in a front-rear direction of the vehicle. Specifically, the seat 13 includes a seat cushion 14 on which an occupant is seated, and a seat back 15 that supports the occupant's back. Further, a right side support portion 16 and a left side support portion 17 are provided at a right and a left portions of the seat back 15 respectively for stabilizing a posture of the occupant by pressing the upper body of the occupant on its sides. Additionally, a right motor 26 and a left motor 27 are provided at a right and a left portions of a seat frame 18 respectively. Each of the right and the left motors 26 and 27 includes a reduction mechanism. Furthermore, a right support frame 16a and a left support frame 17a are adapted to be pivoted by means of the right and the left support motors 26 and 27 respectively. Both right and left support frames 16a and 17a are pivoted by both right and left motors 26 and 27 being driven respectively, and therefore both right and left side support portions 16 and 17 are moved to be in an opened position, which is indicated with a solid line, and to be in a closed position, which is indicated with a chain double-dashed line illustrated in FIG. 2. The right side support portion 16 and the left side support portion 17 each serves as a side support portion, and the right and left motors 26 and 27 each serves as a driving means.

Figure 3:
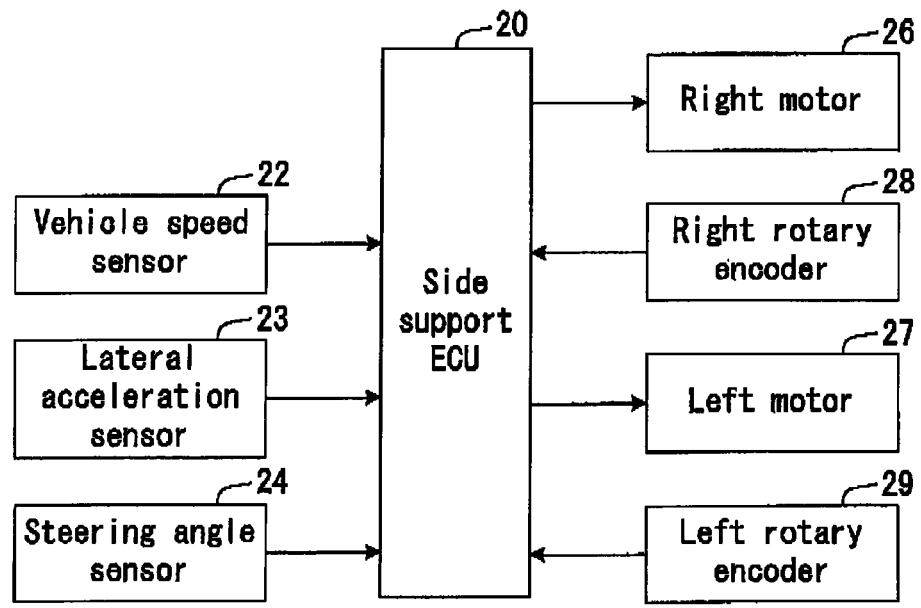
FIG. 3 illustrates an electrical schematic diagram of the seat apparatus according to the first and second embodiments.

FIG. 3 is a chart illustrating electric connections of the seat apparatus. As illustrated in FIG. 3, sensors such as a vehicle speed sensor 22, a lateral acceleration sensor 23 and a steering angle sensor 24 are connected to a side support electronic control unit 20 (hereinafter referred to as a side support ECU 20). The lateral acceleration sensor 23 detects acceleration generated at the vehicle in a lateral direction thereof when the vehicle turns the curve. In this configuration, a detecting signal detected by each of the vehicle speed sensor 22, the lateral acceleration sensor 23 and the steering angle sensor 24 is inputted to the side support ECU 20. Furthermore, the right motor 26, the left motor 27, a right rotary encoder 28 and a left rotary encoder 29 are connected to the side support ECU 20. In this configuration, the side support ECU 20 outputs driving signals to the right and the left motor 26 and 27. Further, the right and the left rotary encoders 18 and 29 output location signals (feedback signals) for successively feeding back positions of the side support portions 16 and 17 until the side support portions 16 and 17 are retained to a target closing position.

Figure 4:
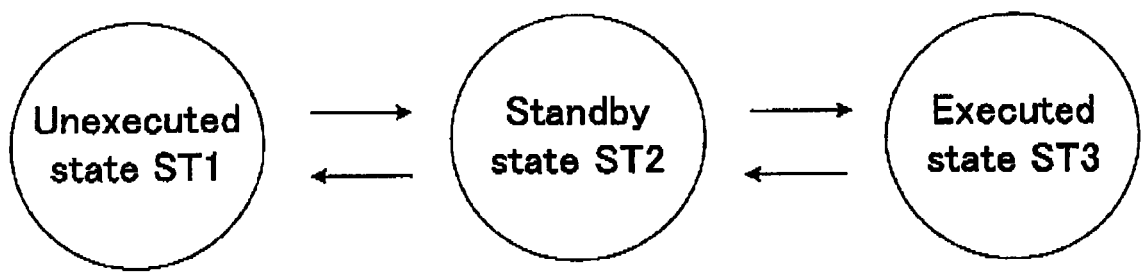
FIG. 4 illustrates a chart indicating control states according to the seat apparatus of the first and second embodiments.

FIG. 4 illustrates a diagram indicating a changing manner of the controlling state. The controlling state is determined on the basis of a road shape on which the vehicle is driven. The side support control program includes three control states; an unexecuted state ST1, a standby state ST2 and an executed state ST3. The unexecuted state ST1 is a control state where the side support ECU 20 determines that the vehicle is not driven on continuous curves, the standby state ST2 is a control state where the side support ECU 20 determines that there is a possibility that the vehicle is driven on the continuous curves, and the executed state ST3 is a control state where the side support ECU 20 determines that the vehicle is driven on the continuous curves. Further, the control state can be changed between the unexecuted state ST1 and the standby state ST2, and between the standby state ST2 and the executed state ST3. The control state cannot be changed from the unexecuted state ST1 directly to the executed state ST3, and from the executed state ST3 directly to the unexecuted state ST1. In other words, the control state can be changed between the unexecuted state ST1 and the executed state ST3 via the standby state ST2.

The standby state ST2 will be explained in detail. As mentioned above, the standby state ST2 is a control state where the side support ECU 20 determines that there is a possibility that the vehicle is driven on the continuous curves. After the control state is changed from the unexecuted state ST1 to the standby state ST2, the side support ECU 20 detects a case where the distance between curves is a second threshold or less, calculates a number of the continuous detections, and determines whether or not the number of detections reaches a second criterial number. If the side support ECU 20 determines that the number of the continuous detections reaches the second criteria number, the control state is changed from the standby state ST2 to the executed state ST3. Accordingly, the standby state ST2 could be considered as a control state where the side support ECU 20 determines that there is a possibility that the vehicle is driven on the continuous curves.

Further, after the control state was changed from the executed state ST3 to the standby state ST2, the side support ECU 20 determines whether or not a distance between a starting point of the standby state ST2 and a starting point of the current curve is equal to or less than a third threshold. If the side support ECU 20 determines that the distance is equal to or less than the third threshold, the control state is changed to the executed state ST3. Accordingly, the standby state ST2 could be considered as a control state where the side support ECU 20 determines that there is a possibility that the vehicle is driven on the continuous curves.

Figure 5:
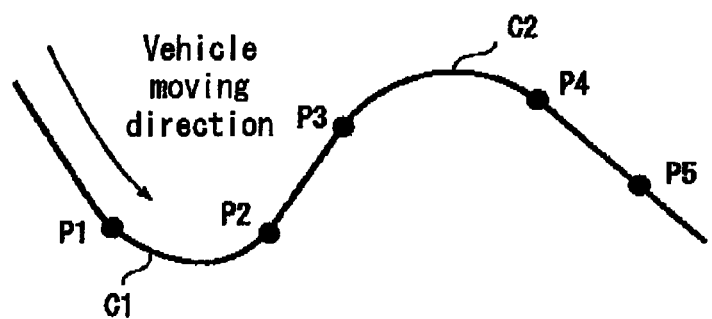
FIG. 5 illustrates a diagram indicating a road on which the vehicle is driven according to the seat apparatus of the first and embodiments.

It is assumed that a vehicle is driven on a road illustrated in FIG. 5 in a vehicle moving direction indicated with an arrow. In FIG. 5, P1 indicates a starting point of a curve C1, P3 indicates a starting point of a curve C2, P2 indicates an ending point of the curve C1, and P4 indicates an ending point of the curve C2. Other portions of the road straight portions. When the vehicle is driven on the curve C2, the curve C1 is indicated as a previous curve, the ending point P2 is indicated as an ending point of the previous curve, the curve C2 is indicated as a current curve, the starting point P3 is indicated as a starting point of the current curve, and a distance between the ending point P2 of the previous curve C1 and the starting point P3 of the current curve C2 is indicated as a distance between curves. On the other hand, when the vehicle is passing a point P5 of the straight portion, the point P5 is indicated as a current position of the vehicle, the curve C2 is indicated as a previous curve, the ending point P4 is indicated as an ending point of the previous curve, the distance between the ending point P4 of the previous curve C2 and the current position P5 or a distance between the starting point of the standby state ST2 on the straight portion and the current position P5 is indicated as a straight portion driving distance.

The retaining control of each of the right and left side support portions 16 and 17 will be explained in accordance with a flowchart of the side support control program illustrated in FIG. 6. The side support control program is repeatedly executed each predetermined time by using the self directed control program. When the side support control program is executed, in Step S1, the side support ECU 20 determines whether or not the vehicle is driven on the curve C2. At this point, the starting point P3 of the curve C2 is determined on the basis of a lateral acceleration detected by the lateral acceleration sensor 23. Instead of the lateral acceleration sensor 23, the starting point P3 may be detected on the basis of the lateral acceleration calculated using a steering angle detected by the steering angle sensor 24 and a vehicle speed detected by the vehicle speed sensor 22. If the side support ECU 20 determines that the vehicle is driven on the curve C2 (YES), the side support ECU 20 proceeds to Step S2, and if the side support ECU 20 determines that the vehicle is not driven on the curve C2 (NO), the side support ECU 20 proceeds to Step S3. After Step S2 and Step S3, the side support control program is terminated.

Figure 7:
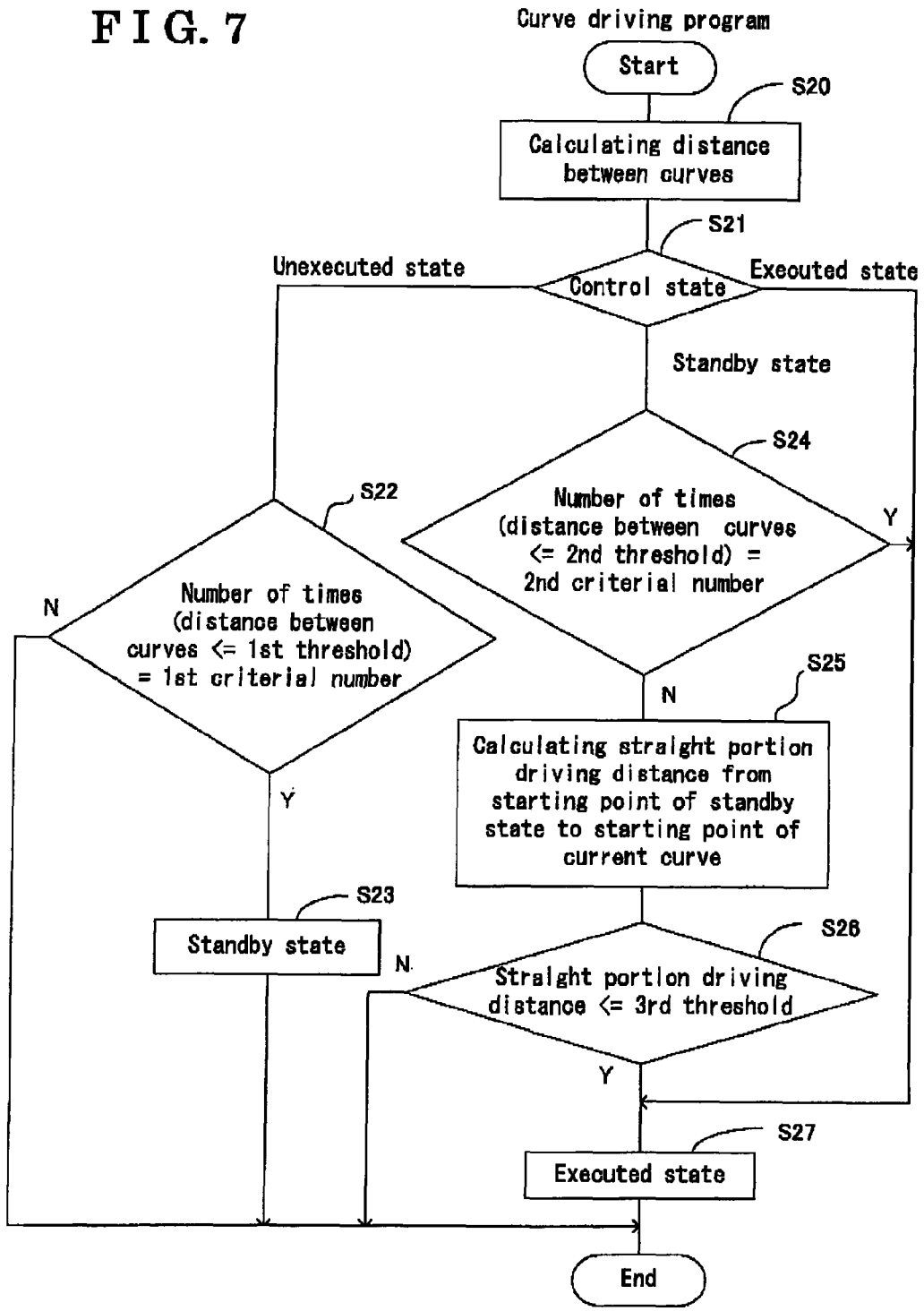
FIG. 7 illustrates a flowchart indicating a curve driving program according to the seat apparatus of the first and second embodiments.

In Step S2, a curve driving program indicated by a flowchart illustrated in FIG. 7 is executed. In this case, the curve C1 indicates a previous curve, the ending point P2 indicates an ending point o the previous curve, the curve C2 indicates a current curve, the starting point P3 indicates a starting point of the current curve, and a distance between the ending point P2 of the previous curve C1 and the staring point P3 of the current curve C2 indicates a distance between curves. When the curve driving program is executed, in Step S20, the side support ECU 20 calculates a distance between curves, specifically, the side support ECU 20 calculates a distance between the ending point P2 of the previous curve C1 and the starting point P3 of the current curve C2. The distance between curves is calculated on the basis of the vehicle speed and a driving time detected by the vehicle speed sensor 22. Hereinafter, the distance is calculated on the basis of the vehicle speed and the driving time detected by the vehicle speed sensor 22. Step S20 serves as a distance between curves calculating means.

In Step S21, the side support ECU 20 checks a current control state. If the current control state is the unexecuted state ST1, the side support ECU 22 proceeds to Step S22, if the current control state is the standby state ST2, the side support ECU 20 proceeds to Step S24, and if the side support ECU 20 is the executed state ST3, the side support ECU 20 proceeds to Step 27.

In Step S22, the side support ECU 20 detects a case where the distance between curves calculated in Step S20 is a first threshold or less, calculates a number of the continuous detections, and determines whether or not the number of detections reaches a first criterial number. If the side support ECU 20 determines that the number of the continuous detections reaches the first criteria number (YES), the side support ECU 20 proceeds to Step S23. On the other hand, if the side support ECU 20 determines that the number of the continuous detections does not reach the first criterial number (NO), the side support ECU 20 terminates the curve driving program.

In Step S23, the side support ECU 20 sets the control state to the standby state ST2 and terminates the curve driving program. This example corresponds to a case where the vehicle is driven on the current curve C2, after the vehicle, which was in the unexecuted state ST1, was driven on the continuous curves for the first criterial number, the continuous curves being connected by a distance between curves that is the first threshold or less. For example, if "2" is set to the first criterial number, this example corresponds to a case where the vehicle is driven on the current curve C2, after the vehicle, which was in the unexecuted state ST1, was driven on the continuous curves two times.

In Step S24, the side support ECU 20 detects a case where the distance between curves calculated in Step S20 is a second threshold or less, calculates a number of the continuous detections, and determines whether or not the number of detections reaches a second criterial number. If the side support ECU 20 determines that the number of the continuous detections reaches the second criteria number (YES), the side support ECU 20 proceeds to Step S27. This example corresponds to a case where the vehicle is driven on the current curve C2, after the vehicle, which was in the standby state ST2, was driven on the continuous curves for the second criterial number, the continuous curves being connected by a distance between curves that is the second threshold or less. For example, if "2" is set to the second criterial number, this example corresponds to a case where the vehicle is driven on the current curve C2, after the vehicle, which was in the standby state ST2, was driven on the continuous curves two times. On the other hand, if the side support ECU 20 determines that the number of the continuous detections does not reach the second criterial number of times (NO), the side support ECU 20 executes Step S25. In this configuration, because the second threshold is set to be larger than the first threshold, the control state changes from the unexecuted state ST1 to the standby state ST2 easier than changing from the standby state ST2 to the executed state ST3. Thus, the continuous curves can surely be detected.

In Step S25, the side support ECU 20 calculates the straight portion driving distance from the starting point of the standby state ST2 to the starting point P3 of the current curve C2. In Step S26, the side support ECU 20 determines whether or not the calculated straight portion driving distance is a third threshold or less. If the straight portion driving distance is the third threshold or less (YES), the side support ECU 20 proceeds to Step S27. This example corresponds to a case where, the vehicle is driven on the current curve C2, after the vehicle, which was in the standby state ST2 on the straight portion, was driven for the straight portion driving distance being the third threshold or less. On the other hand, if the straight portion driving distance is larger than the third threshold (NO), the side support ECU 20 terminates the curve driving program.

In Step S27, the side support ECU 20 sets the control state to the executed state ST3. Then, when the vehicle is driven on the straight portion between the curves, each of the right and left side support portions 16 and 17 are retained to a supporting position by each of the motors 26 and 27. Hereinafter, "retaining the supporting position" indicates that the right and left side support portions 16 and 17 are retained to the supporting positions when the vehicle is driven on the straight portion between the curves. At this point, each the right and left side supporting portions 16 and 17 is retained to a maximum supporting position during the executed state ST3. Specifically, the right and left side support portions 16 and 17 are controlled so as to be opened/closed on the basis of a lateral acceleration detected by the lateral acceleration sensor 23 by following a program (not illustrated). Then, on the basis of the curve driving program and a straight portion running program, which will be explained later, when the control state is set to the executed state ST3, the right and left side support portions 16 and 17 are operated in a direction where the control level increases. As a result, each of the right and left side support portions 16 and 17 is retained to the maximum supporting position during the executed state ST3. After the execution in Step S27 the curve driving program is terminated. On the curve driving program and the straight portion running program, during the unexecuted state ST1 and the standby state ST2, the right and left side support portions 16 and 17 are not retained to the supporting positions and are controlled so as to be opened/closed on the basis of the lateral acceleration detected by the lateral acceleration sensor 23 by following a program (not illustrated).

Figure 6:
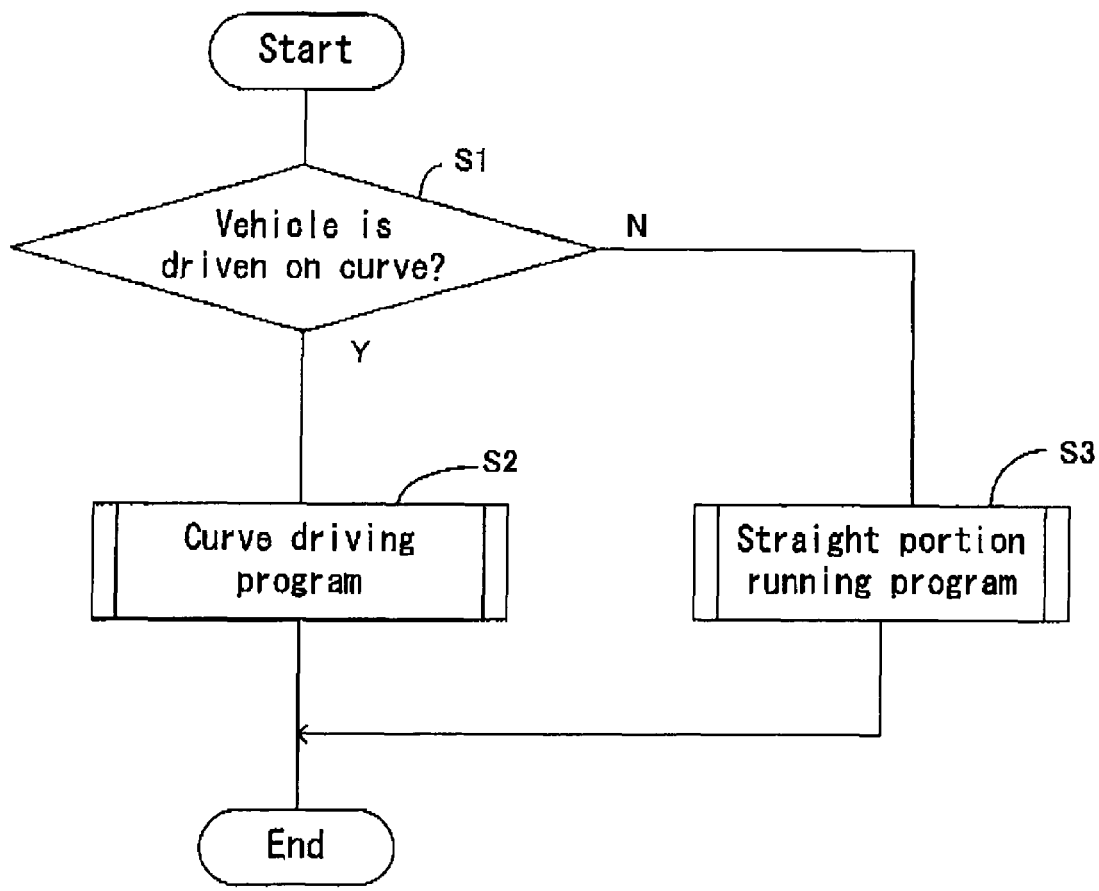
FIG. 6 illustrates a flowchart indicating a side support control program according to the seat apparatus of the first and second embodiments.
Figure 8:
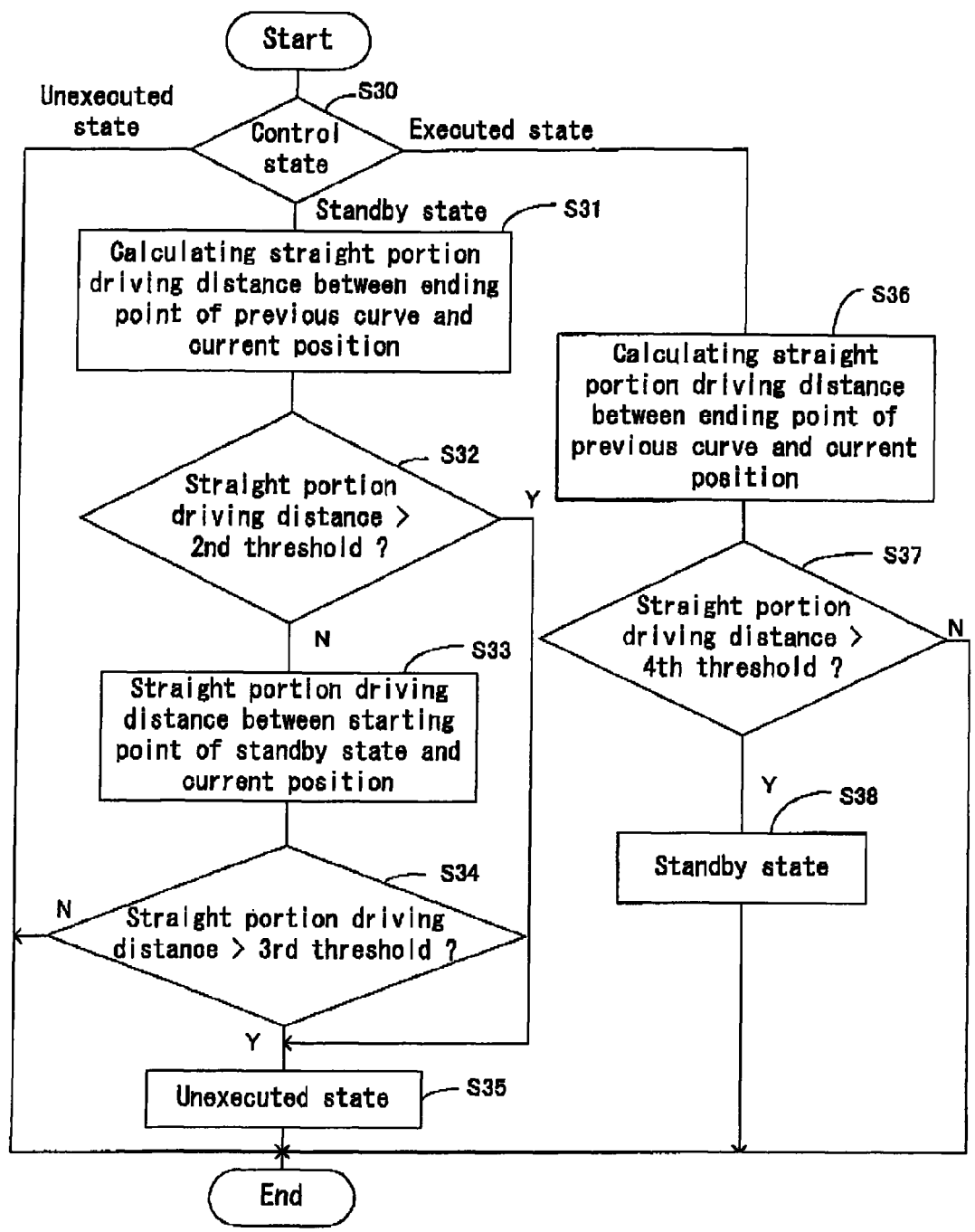
FIG. 8 illustrates a flowchart indicating a straight portion running program according to the seat apparatus of the first and second embodiments.

In Step S3 of the flowchart illustrated in FIG. 6, the straight portion running program, which is indicated by the flowchart illustrated in FIG. 8, is executed. At this point, the point P5 is a current position, the curve C2 is a previous curve, the ending point P4 is an ending point of the previous curve, a distance between the ending point P4 of the previous curve C2 and the current position P5, or a distance between the starting point of the standby state ST2 and the current position P5 is a straight portion driving distance. Once the straight portion running program is executed, the side support ECU 20 checks a current control state in Step S30. If the current control state is set to the unexecuted state ST1, the straight portion running program is terminated. If the current control state is set to the standby state ST2, the side support ECU 20 proceeds to Step S31. If the current control state is set to the executed state ST3, the side support ECU 20 proceeds to Step S36.

In Step S31, the side support ECU 20 calculates a distance between the ending point P4 of the previous curve C2 and the current position P5 during the standby state ST2. Then, the side support ECU 20 proceeds to Step S32. In Step 32, the side support ECU 20 determines whether or not the calculated straight portion driving distance is larger than the second threshold. If the straight portion driving distance is larger than the second threshold (YES), the side support ECU 20 proceeds to Step S35. This example corresponds to a case where the control state is set to the standby state ST2 while the vehicle was driven on the previous curve C2, and the straight portion driving distance between the ending point P4 of the previous curve C2 and the current position P5 is larger than the second threshold. On the other hand, if the straight portion driving distance is the second threshold or less (NO), the side support ECU 20 proceeds to Step S33.

In Step S33, the side support ECU 20 calculates the straight portion driving distance between the starting point of the standby state ST2 and the current position P5. Then, the side support ECU 20 proceeds to Step S34. In Step S34, the side support ECU 20 determines whether or not the straight portion driving distance is larger than the third threshold. If the straight portion driving distance is larger than the third threshold (YES), the side support ECU 20 proceeds to Step S35. This example corresponds to a case where the control state is set to the standby state ST2 while the vehicle is driven on the straight portion, and the straight portion driving distance between the starting point of the standby state ST2 and the current position P5 is larger than the third threshold. On the other hand, if the straight portion driving distance is the third threshold or less (NO), the straight portion running program is terminated.

In Step S35, the side support ECU 20 sets the control state to the unexecuted state ST1 and terminates the straight portion running program In Step S36, the side support ECU 20 calculates the straight portion driving distance between the ending point P4 of the previous curve C2 and the current position P5 during the executed state ST3. Then the side support ECU 20 proceeds to Step S37. In Step S37, the side support ECU 26 determines whether or not the straight portion driving distance is larger than the fourth threshold. If the straight portion driving distance is larger than the forth threshold (YES), the side support ECU 20 proceeds to Step S38. This example corresponds to a case where the control state is set to the executed state ST3 while the vehicle was driven on the previous curve C2, and the straight portion driving distance between the ending point P4 of the previous curve C2 and the current position P5 is larger than the fourth threshold. On the other hand, if the straight portion driving distance is the fourth threshold or less (NO), the straight portion running program is terminated. This example corresponds to a case where the control state has been maintained to the executed state ST3, and each of the right and left side support portions 16 and 17 is retained to the supporting position.

In Step S38, the side support ECU 20 sets the control state to the standby state ST2, and the right and left side support portions 16 and 17, which has been retained to the supporting position, is released, and then the straight portion running program is terminated. Steps S22, S23, S24, S26, S27, S32, S34, S35, S37 and S38 serve as a control state determining means.

According to the seat apparatus of the first embodiment, in Steps S24, S26 and S27, the control state is set to the executed state ST3 on the basis of the distance between the previous curve C1 and the current curve C2 or the distance between the starting point of the standby state ST2 and the starting point P3 of the current curve C2, and then each of the side support portions 16 and 17 is retained to the supporting position by means of each motor 26 and 27.

Thus, even when the vehicle speed is changed, during the executed state ST3, the side support portions 16 and 17 are surely retained to the supporting positions respectively.

Accordingly, when the vehicle is driven on the continuous curves, according to the seat apparatus in the first embodiment the side support portions 16 and 17 are stably controlled.

Further, in the first embodiment, because the control state is set to the unexecuted state ST1, the standby state ST2 or the executed state ST3, even when the control state is set to the standby state ST2 when the vehicle is driven on a long straight portion exists between the continuous curves, the controls states may be rapidly changed to the executed state ST3 on the starting point of the next curve, as a result, the side support portions 16 and 17 are rapidly retained to supporting positions. According to the seat apparatus, the side support ECU 20 easily determines whether or not the vehicle is driven on the curve on the basis of a lateral acceleration detected by the lateral acceleration sensor 23. Instead of the lateral acceleration sensor 23, the curve may be detected on the basis of a lateral acceleration calculated by use of a steering angle detected by the steering angle sensor 24 and a vehicle speed detected by the vehicle speed sensor 22.

Figure 9A:
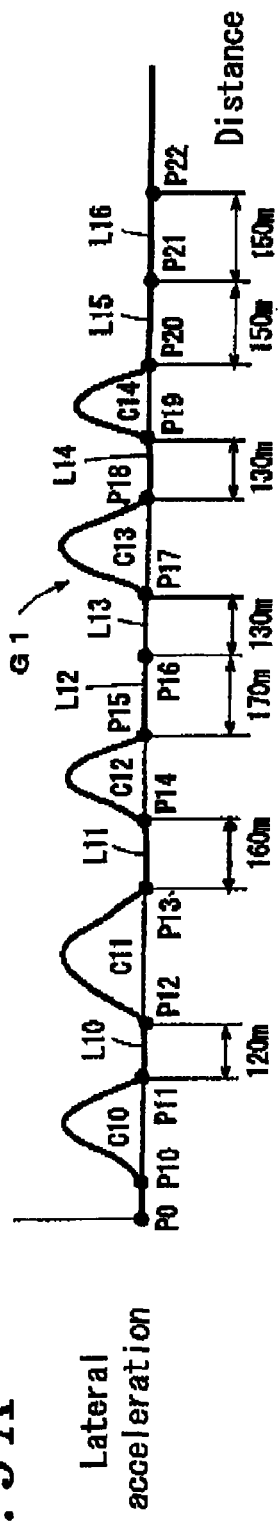
FIG. 9A illustrates a graph indicating a lateral acceleration according to the seat apparatus of the first and second embodiments.
Figure 9B:
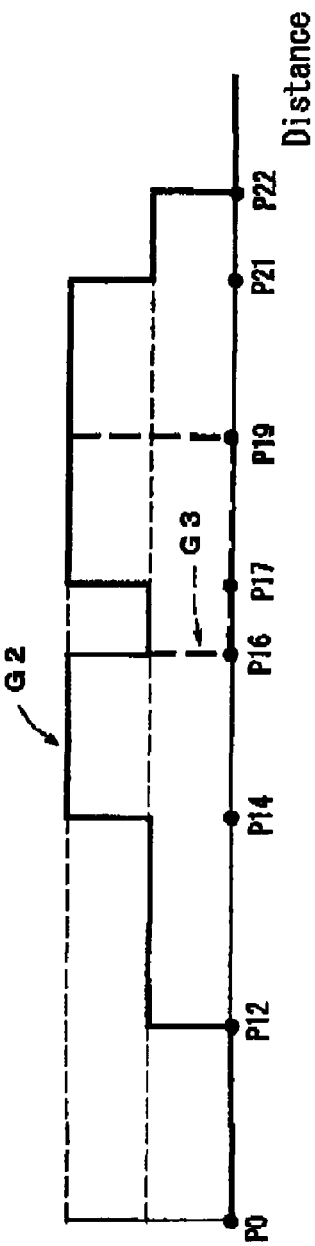
FIG. 9B illustrates a graph indicating the control state according to the seat apparatus of the first and second embodiments.
Figure 9C:
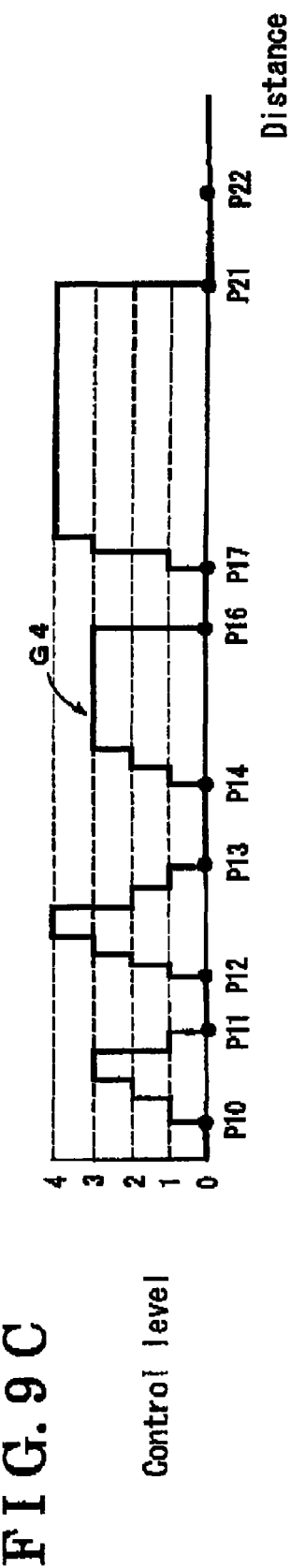
FIG. 9C illustrates a graph indicating the control level according to the seat apparatus of the first and second embodiments.

FIGS. 9A, 9B and 9C illustrates an example when the side support control program is executed. Specifically, FIG. 9A illustrates a graph G1 indicating a relation between the vehicle running distance and the lateral acceleration, FIG. 9B illustrates graphs G2 and G3 each indicating a relation between the vehicle running distance and the control state, and FIG. 9C illustrates a graph G4 indicating a relation between the vehicle running distance and the control level. The control level includes five levels from level 0 to level 4. In FIGS. 9A, 9B and 9C, each of C10 through C14 indicates a curve (curves C10, C11, C12, C13 and C14), and P10 indicates a starting point of the curve C10, P12 indicates a starting point of the curve C11, P14 indicates a starting point of the curve C12, P17 indicates a starting point of the curve C13, and P19 indicates a starting point of the curve C14. Further, P11 indicates an ending point of the curve C10, P13 indicates an ending point of the curve C11, P15 indicates an ending point of the curve C12, P18 indicates an ending point of the curve C13, and P20 indicates an ending point of the curve C14. Furthermore, P0 indicates a point where the vehicle starts moving, and when the vehicle is positioned at the point P0, the control state is in the unexecuted state ST1. The first criterial number is set to "1", the second criterial number is also set to "1", the first threshold is set to 150 m, the second threshold is set to 180 m, the third threshold is set to 150 m, and the fourth threshold is set to 150 m. Further, a straight portion L10 exists between the ending point P11 and the staring point P12, a straight portion L11 exists between the ending point P13 and the starting point P14, a straight portion L12 exists between the ending point P15 and a point P16, a straight portion L13 exists between the point P16 and the starting point P17, a straight portion L14 exists between the ending point P18 and the starting point P19, a straight portion L15 exists between the ending point P20 and a point P21, and a straight portion L16 exists between the point P21 and a point P22. Furthermore, a distance of the straight portion L10 is set to 120 m, a distance of the straight portion L11 is set to 160 m, a distance of the straight portion L12 is set to 170 m, a distance of the straight portion L13 is set to 130 m, a distance of the straight portion L14 is set to 130 m, a distance of the straight portion L15 is set to 150 m and a distance of the straight portion L16 is set to 150 m.

When the vehicle moving from the point P0 is driven on the curve C10, because the distance between curves does not exist, the control state is set to the unexecuted state ST1. As indicated by the graph G4, while the vehicle is driven, the right and left side support portions 16 and 17 are controlled so as to be opened/closed on the basis of the lateral acceleration detected by the lateral acceleration sensor 23 following a program (not shown). While the vehicle is driven on the curve C11, the side support ECU 20 determines in Step S22 that the distance between curves (120 m), which is the distance of the straight portion L10, is less than the first threshold (150 m). Then, the control state is set to the standby state ST2 in Step S23.

While the vehicle is driven on the curve C12, the side support ECU 20 determines in Step S24 that the distance between curves (160 m), which is the distance of the straight portion L11, is less than the second threshold (180 m). Then, the control state is set to the executed state ST3 in Step S27. Then, on the straight portion L12, each of the right and left side support portions 16 and 17 is retained to the supporting position at a level illustrated in the graph G4. Thus, because the second threshold (180 m) is set to be larger than the first threshold (150 m), the control state is changed from the standby state ST2 to the executed state ST3 more smoothly than the case where the control state is changed from the unexecuted state ST1 to the standby state ST2, and the continuous curves are surely detected.

When the vehicle reaches the point P16, the side support ECU 20 determines in Step S37 that the straight portion driving distance (170 m), which is the distance between the ending point P15 of the previous curve C12 and the current position P16, is larger than the fourth threshold (150 m). Then, the control state is set to the standby state ST2 in Step S38. Then, as indicated by the graph G4, each of the right and left side support portions 16 and 17, which has been retained to the supporting position, is released.

while the vehicle is driven on the curve C13, the side support ECU 20 determines in Step S26 that the straight portion driving distance (130 m), which is the distance between the starting point P16 of the standby state ST2 and the starting point P17 of the curve C13, is less than the third threshold (150 m). Then, the control state is set to the executed state ST3 in Step S27. On the straight portion L14, each of the right and left side support portion 16 and 17 is retained to the supporting position at a level indicated by the graph G4. The dashed line in the graph G3 indicates a control state, which is set only to the unexecuted state ST1 or the executed state ST3, not to the standby state ST2. In this case, if the side support ECU 20 detects that the vehicle has passed two continuous curves, the control state being the unexecuted state ST1 is changed to the executed state ST3. When the controls state is not set to the standby state ST2 as indicated in the graph G3, because the control state is changed to the executed state ST3 only when the vehicle reaches the starting point P19 of the curve C14, the right and left side support portions 16 and 17 are not retained to the supporting position on the straight portion L14. On the other hand, according to the seat apparatus in the embodiment, because the control state is set to the unexecuted state ST1, the standby state ST2 or the executed state ST3, in case that the straight portions L12 and L13, whose distances are relatively long, exist in the continuous curves, the control state is set to the standby state ST2 on the straight portion L12, and then the control state is changed to the executed state ST3 at the star point P17 of the curve C13. Thus, as indicated by the graph G4, each of the right and left side support portions 16 and 17 is rapidly retained to the supporting position when the vehicle is driven on the straight portion L14.

When the vehicle is driven on the curve C14, the side support ECU 20 proceeds to Step S21 and then proceeds to Step S27. In Steps S21 and S27, the control state is maintained to the executed state ST3. Then, when vehicle is driven on the straight portion L15, each of the right and left side support portions 16 and 17 is retained to the supporting position at the level indicated by the graph G4. After the vehicle passes the point P21, the side support ECU 20 determines in Step 37 that the straight portion driving distance (150 m), which is a distance of the straight portion L15 between the ending point P20 of the previous curve C14 and the point P21, is larger than the fourth threshold (150 m). Then, the control state is set to the standby state ST2 in Step S38. Then, as illustrated in the graph G4, each of the right and left side support portions 16 and 17, which has been retained to the supporting position, is released.

After the vehicle passes the point P22, the side support ECU 20 determines in Step 34 that the straight portion driving distance (150 m), which is a distance of the straight portion L16 between the ending point P21 of the standby state ST2 and the point P22, is larger than the third threshold (150 m). In Step S35, the control state is set to the unexecuted state ST1.

Next, a seat apparatus in a second embodiment will be explained. In the same manner as the first embodiment, the seat apparatus in the second embodiment is operated by executing the side support control program explained in the drawings illustrated in FIGS. 1 through 8. Specifically, when the program indicated in FIG. 6 is executed, before the side support ECU 20 executes the process in Step S1, a control forcible termination program, which is indicated in a flowchart in FIG. 10, is executed.

In Step S40 of the control forcible termination program, the side support ECU 20 checks whether or not the control state is set to the unexecuted state ST1. If the control state is the unexecuted state ST1 (YES), the side support ECU 20 proceeds to Step S41. If the control state is the standby state ST2 or the executed state ST3 (NO), the side support ECU 20 proceeds to Step S44.

In Step S41, the side support ECU 20 checks whether or not the vehicle is driven at the vehicle speed being lower than 40 km per hour. If the vehicle speed is lower than 40 km per hour (YES), the side support ECU 20 proceeds to Step S42. If the vehicle speed is equal to or more than 40 km per hour (NO), the side support ECU 20 proceeds to Step S43. In this case, the vehicle speed (40 an per hour) is referred to as a first speed.

In Step S42, the side support ECU 20 stops to supply electric power to the motors 26 and 27 so that the controls of the side support portions 16 and 17 are forcibly stopped. Then, the side support ECU 20 terminates the control forcible termination program.

In Step S43, the side support ECU 20 permits to supply the electric power to the motors 26 and 27 so that the operations of the side support portions 16 and 17 are permitted. Then the side support ECU 20 terminates the control forcible termination program.

In Step S44, the side support ECU 20 checks whether or not the vehicle speed is lower than 30 km per hour. If the vehicle speed is lower than 30 km per hour (YES), the side support ECU proceeds to Step S42. If the vehicle speed is equal to or more than 30 km per hour (NO), the side support ECU proceeds to Step S42. In this case, the vehicle speed (30 km per hour) is referred to as a second speed.

According to the seat apparatus in the second embodiment, in the unexecuted state ST1, when the vehicle speed is lower than 40 km per hour, the controls of the side support portions 16 and 17 are stopped. Thus, when the vehicle is driving on a normal road, unnecessary controls to the side support portions 16 and 17 are forcibly stopped. Further, in the standby state. ST2 and the executed state ST3, the controls of the side support portions 16 and 17 are forcibly terminated only when the vehicle is driven at 30 km per hour or lower. Thus, unless the vehicle is driven on, for example, a hairpin curve provided within the continuous curves at lower than the vehicle speed 30 km per hour, each of the side support portions 16 and 17 are retained to the supporting position. The seat apparatus in the second embodiment provides functions and effects that is identical to the seat apparatus in the first embodiment.

According to the seat apparatus, in the executed state, even when the vehicle speed has changed, the side support portion (16/17) is certainly retained to the supporting position. Thus, the supporting operation of the side support portion (16/17) is stably executed when the vehicle is driven on the continuous curves. Further, because the control state is set to the unexecuted state, the standby state or the executed state, when the vehicle is driven on the long straight proportion between the curves and the control state is set to the standby state, the control state is rapidly changed to the executed state at the starting point of the next curve. Thus, on the straight portion between the curves, the side support portion (16/17) is rapidly retained to the supporting position.

Further, the second threshold is set to be larger than the first threshold.

According to the seat apparatus, because the second threshold is larger than the first threshold, the control state is rapidly changed from the standby state to the executed state than the control state being the unexecuted state is changed to the standby state, and thus, the continuous curves are certainly detected.

Furthermore, in the unexecuted state, the driving means (26/27) forcibly stops the operation of the side support portion (16/17) when the vehicle speed is lower than a first speed.

According to the seat apparatus, when the vehicle is driven on a normal road, an unnecessary control of the side support portion (16/17) can be stopped.

Further, in the standby state and the executed state, the driving means (26/27) forcibly stops the operation of the side support portion (16/17) when the vehicle speed is lower than a second speed, which is set to be lower than the first speed.

According to the seat apparatus, unless the vehicle is driven on, for example, a hairpin curve provided within the continuous curves at lower than the second speed, the side support portion (16/17) is retained to the supporting position.

Further, the sensor is a lateral acceleration sensor (23) for detecting acceleration generated at the vehicle in a lateral direction thereof.

According to the seat apparatus, using the lateral acceleration sensor (23), a curve is easily detected.

Further, the sensor includes a steering angle sensor (24) and a vehicle speed sensor (22).

According to the seat apparatus, using the steering angle sensor (24) and the vehicle speed sensor (22), a curve can also be detected.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A seat apparatus for a vehicle including a driving means for driving a side support portion in accordance with a road condition, comprising:
   a sensor for detecting the vehicle being traveling on a curve;

a distance between curves calculating means for calculating a distance between curves on the basis of the sensor, the distance between curves being a distance between an ending point of a previous curve, on which the vehicle has already been traveled, and a starting point of a current curve, on which the vehicle is currently travels; and a control state determining means for determining any one of an invalid state, by which it is determined that the road condition does not indicate continuous curves, an execution state, by which it is determined that the road condition indicates the continuous curves, and a standby state, by which the control state is mutually changeable between the invalid state and the standby state and between the execution state and the standby state and it is determined that the road condition may possibly include the continuous curves, as a control state, wherein the control state determining means determines the standby state as the control state in a case where the vehicle is in the invalid state before the vehicle travels on the current curve and the distance between the curves being equal to or less than a first reference distance is continuously detected for a first reference number of times while the vehicle is traveling on the current curve, the control state determining means determines the execution state as the control state in a case where the vehicle is in the standby state before the vehicle travels the current curve and the distance between the curves being equal to or less than a second reference distance is continuously detected for a second reference number of times while the vehicle is traveling on the current curve, the control state determining means determines the invalid state as the control state in a case where a linear traveling distance between the ending point of the previous curve and a current position of the vehicle is greater than the second reference distance after the control state is switched to the standby state, the control state determining means determines the execution state as the control state in a case where the vehicle is in the standby state before the vehicle travels on the current curve and a linear traveling distance between a starting point of the standby state and the starting point of the current curve is equal to or less than a third reference distance while the vehicle is traveling on the current curve, the control state determining means determines the invalid state as the control state in a case where a linear traveling distance between the staring point of the standby state and the current position of the vehicle is greater than the third reference distance, the control state determining means determines the standby state as the control state in a case where a linear traveling distance between the ending point of the previous curve and the current position of the vehicle is greater than a fourth reference distance after the control state is switched to the execution state, and the driving means retains the side support portion at a supporting position while the control state is in the execution state.

2. The seat apparatus according to claim 1, wherein the second reference distance is greater than the first reference distance.

3. The seat apparatus according to claim 2, wherein, the driving means forcibly inhibits an operation of the side support portion in a case where the vehicle speed is lower than a first speed while the vehicle is in the invalid state.

4. The seat apparatus according to claim 3, wherein the driving means forcibly inhibits the operation of the side support portion in a case where the vehicle speed is lower than a second speed, which is set to be lower than the first speed, while the vehicle is in the standby state or the execution state.

5. The seat apparatus according to claim 4, wherein the sensor is a lateral acceleration sensor.

6. The seat apparatus according to claim 4, wherein the sensor includes a steering angle sensor and a vehicle speed sensor.

7. The seat apparatus according to claim 3, wherein the sensor is a lateral acceleration sensor.

8. The seat apparatus according to claim 3, wherein the sensor includes a steering angle sensor and a vehicle speed sensor.

9. The seat apparatus according to claim 2, wherein the sensor is a lateral acceleration sensor.

10. The seat apparatus according to claim 2, wherein the sensor includes a steering angle sensor and a vehicle speed sensor.

11. The seat apparatus according to claim 1, wherein, the driving means forcibly inhibits an operation of the side support portion in a case where the vehicle speed is lower than a first speed while the vehicle is in the invalid state.

12. The seat apparatus according to claim 11, wherein the driving means forcibly inhibits the operation of the side support portion in a case where the vehicle speed is lower than a second speed, which is set to be lower than the first speed, while the vehicle is in the standby state or the execution state.

13. The seat apparatus according to claim 12, wherein the sensor is a lateral acceleration sensor.

14. The seat apparatus according to claim 12, wherein the sensor includes a steering angle sensor and a vehicle speed sensor.

15. The seat apparatus according to claim 11, wherein the sensor is a lateral acceleration sensor.

16. The seat apparatus according to claim 11, wherein the sensor includes a steering angle sensor and a vehicle speed sensor.

17. The seat apparatus according to claim 1, wherein the sensor is a lateral acceleration sensor.

18. The seat apparatus according to claim 1, wherein the sensor includes a steering angle sensor and a vehicle speed sensor.

* * * * *